United States Patent
Kapil

(10) Patent No.: US 8,127,153 B2
(45) Date of Patent: Feb. 28, 2012

(54) MEMORY POWER PROFILING

(75) Inventor: Sanjiv Kapil, Cupertino, CA (US)

(73) Assignee: Oracle America, Inc., Rewood City, CA (US)

( * ) Notice: Subject to any disclaimer, the term of this patent is extended or adjusted under 35 U.S.C. 154(b) by 786 days.

(21) Appl. No.: 12/181,784

(22) Filed: Jul. 29, 2008

(65) Prior Publication Data
US 2010/0031075 A1 Feb. 4, 2010

(51) Int. Cl.
*G06F 1/00* (2006.01)
*G06F 1/26* (2006.01)
(52) U.S. Cl. .................. 713/300; 713/320; 702/108
(58) Field of Classification Search .............. 713/300, 713/320
See application file for complete search history.

(56) References Cited

U.S. PATENT DOCUMENTS

| | | | | |
|---|---|---|---|---|
| 6,167,484 | A * | 12/2000 | Boyer et al. | 711/106 |
| 6,751,739 | B1 * | 6/2004 | Verdun | 713/300 |
| 7,516,346 | B2 * | 4/2009 | Pinheiro et al. | 713/324 |
| 7,516,456 | B2 * | 4/2009 | Aguilar et al. | 718/102 |
| 7,539,882 | B2 * | 5/2009 | Jessup et al. | 713/300 |
| 2005/0198542 | A1 * | 9/2005 | Freker et al. | 713/320 |
| 2007/0005825 | A1 * | 1/2007 | Henson et al. | 710/22 |

OTHER PUBLICATIONS

Micron, Technical Note, "FBDIMM—Channel Utilization (Bandwidth and Power)," 2006 Micron Technology, Inc. pp. 1-22.
Micron, Technical Note, "Calculating Memory System Power for DDR2," 2005 Micron Technology, Inc. pp. 1-26.
AMD, "BIOS and Kernel Developer's Guide (BKDG) for AMD Family 10h Processors," 31116 Rev 3.06, Marcy 26, 2008.
AMD, AMD 64-Bit Technology, "AMD x86-64 Architecture Programmer's Manual vol. 2: System Programming," Rev. 3.00, Jan. 2002.
"PowerPC 604 RISC Microprocessor User's Manual," 1994 Motorola, Inc.

* cited by examiner

*Primary Examiner* — Mark Connolly
(74) *Attorney, Agent, or Firm* — Lawrence J. Merkel; Meyertons, Hood, Kivlin, Kowert & Goetzel, P.C.

(57) ABSTRACT

In an embodiment, an apparatus comprises one or more registers and a control unit coupled to the one or more registers. The control unit is configured to monitor a power state in one or more memory modules during execution of an application, and to store data generated during the monitoring in the one or more registers. In an embodiment, a system comprises a memory controller and a plurality of memory module interface units (MMIUs) coupled to the memory controller. Each of the plurality of MMIUs: is coupled to a respective plurality of memory modules; comprises one or more registers; is configured to monitor a power state in the respective plurality of memory modules during execution of an application; and is configured to store data generated during the monitoring in the one or more registers.

20 Claims, 6 Drawing Sheets

Computer Accessible Storage Medium 200

Memory Power Profiler 110

Fig. 7

MEMORY POWER PROFILING

BACKGROUND

1. Field of the Invention

This invention is related to memory systems for computer systems, and specifically to power and performance in memory systems.

2. Description of the Related Art

Reducing the power consumed by computer systems of various types has quickly becoming a focus for computer system manufacturers. For example, mobile devices such as laptops, cell phones, personal digital assistants (PDAs), etc. are common and battery life can be extended by reducing the power consumption. Server-class computers are frequently deployed in rack mounts and other configurations which place the computers in close proximity to each other and other devices. Because the heat (a function of the power consumed) is challenging to dissipate in such configurations, the power consumed in the computer is a concern for these computers as well.

In the past, the focus has been on reducing the power consumed by processors in the computer systems. However, as the size of the main memory system has grown and the clock frequency of the synchronous dynamic random access memories (SDRAMs) used to populate the main memory system has increased, the power consumed in the main memory system has become a larger factor in overall system power consumption. Modern SDRAMs implement various power modes, with increasing amounts of power saved but also increasing latencies to exit the low power mode. Selecting which power mode is best for a given application is unclear.

SUMMARY

In an embodiment, an apparatus comprises one or more registers and a control unit coupled to the one or more registers. The control unit is configured to monitor a power state in one or more memory modules during execution of an application, and to store data generated during the monitoring in the one or more registers.

In an embodiment, a method comprises monitoring a power state in one or more memory modules in a memory system during execution of an application; generating data during the monitoring that describes the monitored power state; and storing the data generated during the monitoring in the one or more registers.

In an embodiment, a system comprises a memory controller and a plurality of memory module interface units (MMIUs) coupled to the memory controller. Each of the plurality of MMIUs: is coupled to a respective plurality of memory modules; comprises one or more registers; is configured to monitor a power state in the respective plurality of memory modules during execution of an application; and is configured to store data generated during the monitoring in the one or more registers.

BRIEF DESCRIPTION OF THE DRAWINGS

The following detailed description makes reference to the accompanying drawings, which are now briefly described.

FIG. 7 is a block diagram of one embodiment of a computer accessible storage medium.

Figure 1:
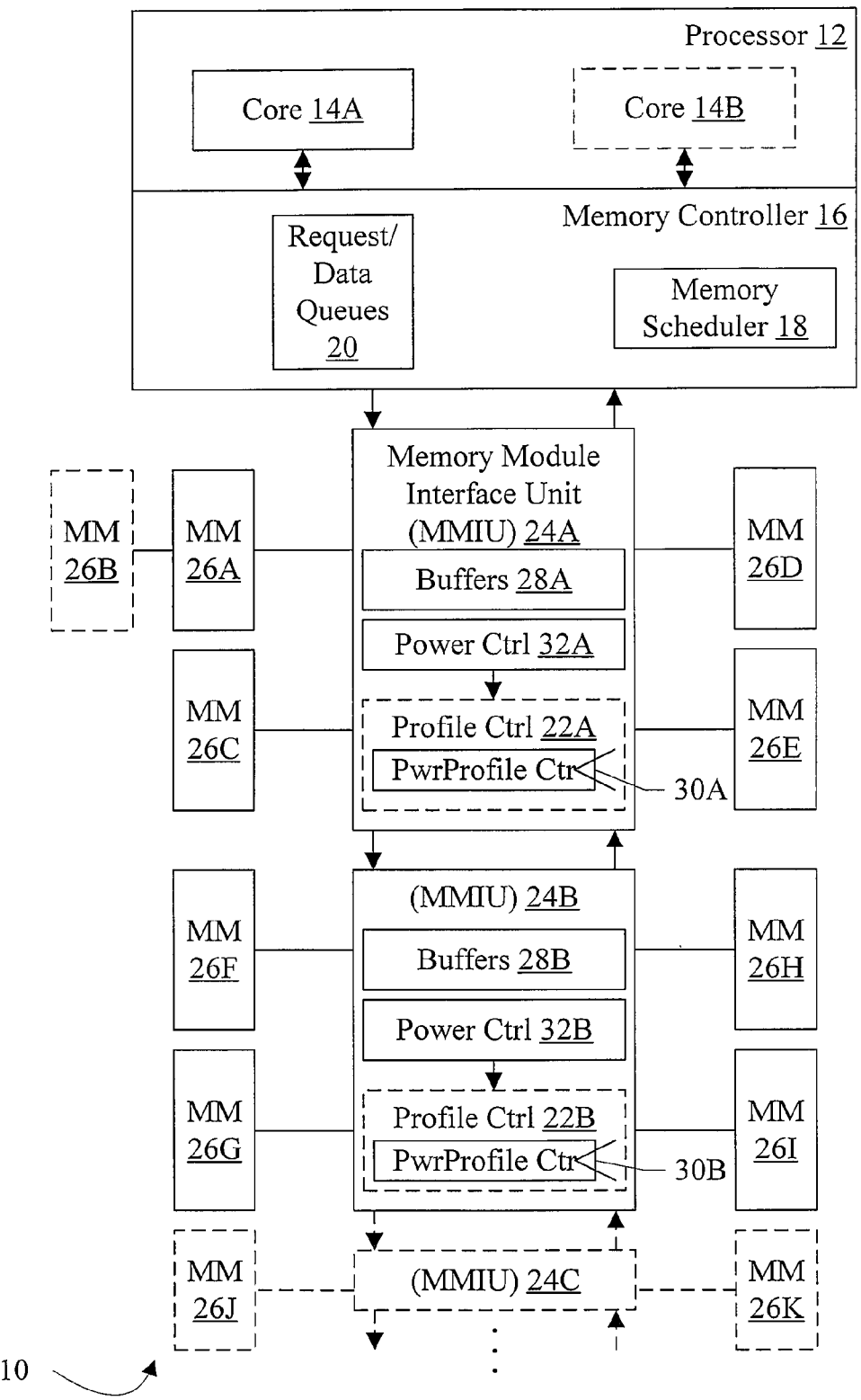
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a computer system 10 is shown. In the embodiment of FIG. 1, the computer system 10 comprises a processor 12 that comprises at least one processor core 14A and optionally may include additional processor cores such as optional processor core 14B, in some embodiments. The processor 12 further includes a memory controller 16 that may include a memory scheduler 18 and request/data queues 20. In one embodiment, the processor 12 may comprise an integrated circuit integrating the memory controller 16 and the processor cores 14A-14B.

The system 10 further comprises one or more memory module interface units (MMIUs) 24A-24C. Each MMIU 24A-24C is coupled to one or memory modules (MMs), such as the memory modules 26A-26K. For example, the MMIU 24A is coupled to the memory modules 26A-26E in FIG. 1; the MMIU 24B is coupled to the memory modules 26F-26I in FIG. 1; and the optional MMIU 24C is coupled to the optional memory modules 26J-26K in FIG. 1. The number of MMIUs, and the number of memory modules coupled to a given MMIU, may vary in other embodiments. There may be, e.g., only one MMIU or more than two MMIUs. There may also be at least one memory module coupled to a given MMIU, and there may be multiple memory modules coupled to the MMIU. Different MMIUs in the same system may have different numbers of memory modules coupled to them, and the memory modules may have different capacities. The MMIUs, in the illustrated embodiment, are coupled in cascade fashion to the memory controller 16 (also referred to as a daisy chain connection, in some cases). That is, the MMIU 24A is coupled to the memory controller 16 and the MMIU 24B. The MMIU 24B is further coupled to the optional MMIU 24C, etc. In some embodiments, the MMIU 24B is also optional (e.g. there may be only one MMIU).

In the illustrated embodiment, the MMIU 24A and the MMIU 24B are illustrated in greater detail. Specifically, the MMIU 24A comprises buffers 28A, a power control unit 32A, and a profile control unit 22A that further includes one or more power profile counter registers 30A. Similarly, the MMIU 24B comprises buffers 28B, a power control unit 22B, and a profile control unit 22B that further includes one or more power profile counter registers 30B. The power control units 32A-32B are coupled to the profile control units 22A-

22B. The buffers 28A-28B may provide temporary storage for data being transferred to and from the memory modules.

Each MMIU 24A-24C comprises circuitry to communicate with the memory modules 26A-26K to which that MMIU 24A-24C is coupled. The circuitry may drive and receive signals on the interfaces to the memory modules according to the definition of the interface. For example, in one embodiment, the memory modules may comprise fully buffered dual inline memory modules (FBDIMMs), and the interface may be the FBDIMM interface. Other embodiments may implement other memory standards. Generally, a memory module may comprise one or more memory devices (e.g. DRAM devices such as SDRAMs and more particularly double data rate (DDR) SDRAMs, DDR2 SDRAMs, or DDR3 SDRAMs). The memory module further comprises a substrate (e.g. a printed circuit board) to which the memory devices are connected. The substrate is dimensioned for insertion into a standard memory module connector. The memory module connector provides electrical and mechanical connection to a printed circuit board to which the MMIUs 24A-24C and possibly other components of the system (e.g. the processor 12) are connected (e.g. a "motherboard" or "CPU board"). In one embodiment, a memory module may have a single rank, a dual rank, or a quad rank configuration. Different ranks on the same memory module are independently accessible. For example, a memory access to one rank does not affect which row in the other rank is open, etc. The rank may sometimes refer to whether both sides of the memory module are populated with memory chips, and/or the logical arrangement of the memory chips. For example, a single rank module may only have memory chips located on one side and a dual rank module may have memory chips located on both sides of the module, in some embodiments. A quad rank memory module may have two ranks of memory modules on each side of the memory module. Further, on dual or quad rank modules, each rank may be accessed via a different address and/or control signals (e.g., a different chip select signals).

Each memory module interface from a given MMIU 24A-24C may support at least one memory module, and in some embodiments more than one memory module can be connected to the same interface (e.g. memory modules 26A-26B in FIG. 1). Accordingly, a given interface may include multiple ranks of memory (e.g. two single rank memory modules would be two ranks, two dual rank memory modules would be four ranks, two quad rank memory modules would be eight ranks, etc.). Two or more memory module interfaces can be ganged together, in which the same address is provided concurrently on each memory module interface and the data provided on each memory module interface is concatenated or interleaved to provide the requested data. Effectively, ganging two interfaces may double the data width for a memory access. In other embodiments, data may be interleaved one two or more memory module interfaces to more rapidly transfer a block of data (e.g. a cache line of data).

The power control units 32A-32B are configured to manage the power of the memory modules 26A-26I. For example, the power control units 32A-32B may determine when the low power state is to be entered and exited for the current memory power management mode. The power control units 32A-32B may also include the circuitry that causes the entry/exit from the memory power management mode (e.g. by transmitting commands to the memory modules, or by controlling the transmission of commands such as activate commands according to the selected memory power management mode). The power control units 32A-32B may be coupled to the profile control units 22A-22B to signal events/counts monitored by the profile control units 22A-22B.

The profile control units 22A-22B are configured to monitor the power state of the memory modules and/or portions thereof (e.g. ranks of the memory modules) during execution of an application or thread, and further configured to capture data that describes the power state. The profile control units may store the captured data in the power profile counter registers 30A-30B, which can be read subsequent to the application execution and processed to profile the power usage of the application in the memory system. Thus, the system 10 may provide information that permits the tuning of the memory system, such as the memory power management modes that are used during execution of the application. The tuning may permit optimization of the power consumed during execution of the application. Various embodiments may support the use of different memory power management modes at different levels of granularity (e.g. at the memory module level, at the interface level, at the MMIU level, at the rank level, at the bank level, etc.) in the memory system. For the remainder of this description, support of different memory power management modes at the rank level will be described, or support of different memory power management modes at the memory module level with entry/exit to the lower power state controlled at the rank level. However, other levels of granularity are possible in other embodiments.

Each memory power management mode may include a high power state (e.g. normal access to the memory) and at least one low power state in which power is consumed at a lower rate but access to the memory may be slower. Some power management modes may permit more than one low power state, and the low power states may differ in terms of power conserved and memory latency.

Each memory power management mode may differ from the other memory power management modes in terms of the amount of power conserved in the low power state (e.g. as compared to the high power state), and in the memory latency incurred in the low power state. More specifically, in one embodiment, the memory module (or rank) may be inaccessible in the low power state of some memory power management modes, and may incur a latency to transition out of the low power state back to the high power state to service the memory access. The latency may be longer for the memory power management modes that conserve the most power in their low power states (as compared to the low power states of other memory power management modes) and thus there is a performance/power trade off in selecting a memory power management mode. Other memory power management modes may control the rate at which commands may be transmitted to the memory modules, which may also increase the average latency of memory accesses.

A given memory power management mode may be referred to as a lower memory power management mode with respect to another memory power management mode if it conserves more power (consumes less power) in its low power state than the other memory power management mode conserves/consumes in its low power state. Similarly, a given memory power management mode may be referred to as a higher memory power management mode with respect to another memory management mode if it consumes more power in its low power state than the other memory power management mode consumes in its low power state.

Some of the memory power management modes are established by transmitting a configuration cycle to the memory module. For example, the FBDIMM specification includes mode registers that can be written using configuration cycles on the FBDIMM interface. The memory power management mode can be changed dynamically, but involves a significant latency and so is not changed frequently. The mode registers may include a variety of different mode settings for the memory modules, in addition to the selection of the memory power management mode. In one embodiment, the memory power management mode is selected on a memory module basis, but ranks may enter and exit the low power state independently. In such embodiments, different memory power management modes are supported in the system at the memory module level of granularity. In other embodiments, the memory power management mode may be selected on a per-rank basis. In such embodiments, different memory power management modes are supported in the system at the rank level of granularity.

Once the memory power management mode is established, the low power state may be entered and exited using commands transmitted to the memory modules (or ranks). That is, the same commands may be used to enter and exit the low power state, respectively, for each of the memory power management modes, in one embodiment. The specific low power state that is entered is controlled by the memory power management mode that was previously written to the mode registers.

The FBDIMM specification includes at least three memory power management modes: the self refresh mode, the precharge power down slow exit mode (PPSE mode), and the precharge power down fast exit mode (PPFE mode). The self refresh mode is the memory power management mode that consumes the least power in its low power state (self refresh active), and also requires the longest latency to exit the low power state and return to the high power state (active). That is, the low power state may comprise the memory chips performing self refresh operations to retain the data in the chips. The latency to exit self refresh may be, e.g., approximately 200 clock cycles of the clock provided to the memory modules. The PPSE mode is the next higher power management mode, and requires about 20 clock cycles to exit the low power state. In the PPSE mode, the low power state comprises gating the clock to the memory chips and disabling the digital lock loop (DLL) on the memory modules. The PPFE mode is the highest memory power management mode. Its low power state may include gating the clock to the memory chips but not disabling the DLL, and may require about 5 clock cycles to exit the low power state. These memory power management modes will be used as examples herein, but other embodiments may implement any desired set of memory power management modes, including subsets and/or supersets of the above modes and other modes.

Because the different memory power management modes may incur different latencies in exiting the low power state, the power control units 32A-32B may use different criteria for determining when to enter the low power state. That is, the power control units 32A-32B may be more conservative in choosing to enter the low power state in a memory power management mode that has a high latency to exit the low power state then in a memory power management mode with a lower latency to exit the low power state. Thus, it is possible that a higher memory power management mode may be more efficient at conserving power than a lower memory power management mode, because the low power state may be entered more frequently. Similarly, if a higher memory power management mode is being entered frequently, it is possible that a lower memory power management mode may be entered frequently enough that the lower memory power management mode will be more efficient. Using the profile control units' 22A-22B monitoring abilities, the power profile of an application may be determined and tuning of the memory power management mode may be possible.

In addition to the memory power management modes implemented on the memory modules, some embodiments may implement memory power management modes that are controlled by the power control units 32A-32B without specific implementation in the memory modules. For example, the power control units 32A-32B may implement memory power management modes that increase the minimum spacing (in terms of clock cycles of the clock provided to the memory modules) between certain commands to the memory modules. In one embodiment, a memory power management mode may be supported in which the activate commands are limited in spacing. If an activate command is to be transmitted, but the minimum spacing has not been met, then the activate command is delayed. Each delayed activate command may be counted as an event, and/or the number of clock cycles of delay may be counted as a count. These counts may provide an estimate of the bandwidth lost due to the delays in activate commands. The activate spacing mode may reduce power consumed by activated new rows/banks in the memory modules, and may also reduce power consumed in precharging for an activate.

Another memory power management mode that may be implemented by the power control units 32A-32B may limit the number of banks that may be opened in a given period of time. Once the limit is reached, the power control units 32A-32B may delay subsequent commands that will open a new bank until the period of time expires. Again, each command that is delayed may be counted as an event, and the number of delay cycles may be counted as a count.

Yet another memory power management mode that may be implemented by the power control units 32A-32B may be related to self refresh mode. In this mode, a rank may be taken offline by placing a rank in the self refresh mode while keeping other ranks on the same interface active. Taking the rank offline may be counted as an event, and the number of clock cycles that the rank is offline may be counted as a count.

The above memory power management modes that are implemented in the power control units 32A-32B instead of the memory modules are still be referred to as the power state in the memory modules (or in the ranks of the memory modules, or any other granularity) even though they are implemented outside the memory modules. The low power state may be the state of delaying the activate command, the maximum number of banks opened, or taking a rank offline, for example. The high power state may be the state of no delay, permitting a new bank to be opened, or rank online.

The profile control units 22A-22B may capture any type of data. For example, the profile control units 22A-22B may monitor the number of times that the low power state is entered during execution of the application. This type of count will be referred to herein as an event count, since it counts the number of occurrences of the low power transition. Alternatively or in addition, the profile control units 22A-22B may monitor the number of clock cycles (of the clock provided to the memory modules on the memory module interface) that the low power mode is in effect. Based on the number of clock cycles (as compared to the total number of clock cycles of execution), the power consumed may be calculated. Running the application with different selected memory power management modes may permit calculation of the power consumed in the various memory power management modes, allowing effectiveness of the various modes to be assessed. With various processor core performance monitoring features to determine the performance of the application with the various memory power management modes active, the performance and power using the memory power management modes may be determined and may be used to identify the desired power management mode.

In one embodiment, the profile control units 22A-22B may each include at least one register 30A-30B for each rank of memory module attachable to the MMIU 24A-24B. Other embodiments may include additional registers per rank (e.g. to capture an event count and a cycle count per rank). Other embodiments may share the registers 30A-30B, such that additional profiling runs may be needed to fully profile an application. For example, if 4 registers were included and 8 ranks were populated on an MMIU, then two profiling runs would be needed to profile all 8 ranks for a given setting of memory power management modes.

In the illustrated embodiment, as mentioned previously, the MMIUs 24A-24C are coupled in a cascaded fashion. Accordingly, any memory access having an address mapped to any memory module coupled to any of the MMIUs 24A-24C is issued by the memory controller 16 on the interface to the MMIU 24A. In some embodiments, the memory controller 16 may not have any information about which addresses are mapped to which MMIUs. The MMIU 24A may be programmable with an address range that is mapped to the memory modules 26A-26E coupled to the MMIU 24A. If the address of a memory access is mapped to the memory modules 26A-26E, the MMIU 24A may accept the memory access and may perform the access to the memory modules. If the address is not mapped to the memory modules 26A-26E, the MMIU 24A may forward the memory access on the interface to the MMIU 24B. In similar fashion, the MMIU 24B may accept the memory access or forward the memory access, based on the address of the memory access and the address ranged programmed into the MMIU 24B.

Accordingly, the interface between the MMIU 24A and the memory controller 16, the interface between the MMIU 24A and MMIU 24B, the interface between the MMIU 24B and the MMIU 24C, etc. may all be part of a same interface. In the illustrated embodiment, the interface may comprise unidirectional point to point links between MMIUs and between the MMIU 24A and the memory controller 16. The memory controller 16 may transmit memory access commands and memory write data on the links flowing downward as illustrated in FIG. 1, and memory read data may be returned by the MMIUs on links flowing upward in FIG. 1. In one embodiment, the interface between the MMIUs 24A-24C and the memory controller 16 may be compatible with the FBDIMM interface. Alternatively, the links may implement a custom interface defined for communication by the designer specifically for communication between the memory controller 16 and the MMIUs 24A-24C. While unidirectional, point to point links are used in the illustrated embodiment, other embodiments may implement any other desired links. In some embodiments, there may be more than one interface per memory controller 16. Each interface would couple to a cascade of one or more MMIUs.

The memory scheduler 18 may be configured to schedule memory accesses for transmission to the MMIUs 24A-24C. The memory accesses may be queued in the request/data queues 20, and may be sourced from the processor cores 14A-14B. In some embodiments, the processor 12 may be coupled to various peripheral (or input/output (I/O) devices), and memory accesses may also be sourced from these devices (e.g. direct memory access (DMA) accesses).

The memory scheduler 18 may schedule the memory accesses in part based on the latencies for data returning on the interface (including any latencies caused by a memory power management mode), for read accesses. That is, when a given read command is transmitted, one or more transmissions on the return link from the MMIU 24A will occur at a later point in time based on the memory latency. Thus, another read command may be not be scheduled until there is bandwidth available on the return link. For example, if all memory is the same latency, then another read command may not be scheduled until a number of clock cycles equal to the number of read data transfers has elapsed. If 4 read data transfers on performed on the return link, then a read command may not be schedules for another 4 clock cycles.

The processor cores 14A-14B may generally comprise circuitry configured to execute instructions defined in an instruction set architecture implemented by the processor 12. For example, in one embodiment, the processor cores 14A-14B may implement the SPARC instruction set architecture. Other embodiments may implement other instruction set architectures (e.g. PowerPC, x86 (or IA-32), IA-64, MIPS, ARM, etc.).

The processor cores 14A-14B may employ any construction, including scalar, superscalar, pipelined, superpipelined, in-order, out-of-order, and/or combinations thereof. In some embodiments, the processor cores 14A-14B may be multithreaded cores. Multithreaded cores have hardware support for executing multiple active threads simultaneously. That is, instructions from different threads may be executed without requiring a context switch. For example, the processor cores 14A-14B may support multiple copies of the general register set, one for each active thread. Other embodiments may implement single threaded processor cores 14A-14B.

While the illustrated embodiment includes the memory controller 16 integrated with the processor cores 14A-14B, other embodiments may implement the memory controller 16 separately. Still other embodiments may implement the memory controller 16 integrated with other components (e.g. an I/O bridge such at the north bridge used to bridge from a processor interface to an I/O interface such as Peripheral Component Interconnect (PCI)). In still other embodiments, the memory controller 16 may be integrated with the MMIUs 24A-24C and/or the processor cores 14A-14B.

In one embodiment, each MMIU 24A-24C may be configured (e.g. programmed in a register, or via pins or input signals to the MMIU 24A-24C) to operate the memory modules coupled to that MMIU 24A-24C at a different frequency. That is, the interfaces to the memory modules include a clock signal or signals, and the frequency of the clock is programmed differently for each MMIU 24A-24C. The higher the frequency, the lower the latency for reads and writes to the memory modules and the higher the power consumption in the memory modules. In this fashion, the memory addresses that are mapped to the memory modules coupled to a given MMIU may form a zone in the memory address space that has particular power/performance characteristics. By allocating pages for threads executing on the processor 12 to specific zones, the power consumed (and performance achieved) during execution of the thread may be controlled. Accordingly, per thread (or per application) power consumption and performance may be controlled. Generally, a thread may comprise an independently schedulable (e.g. from an operating system point of view) sequence of instructions. Threads may generally execute in parallel, with software synchronization constructs such as semaphores used to control any interaction between threads, if any. In some embodiments, the memory modules 26A-26K may all be members of the same memory technology family. A technology family may share the same interface definition, programming model, and electrical specifications. Members of the technology family may be operable at a plurality of frequencies that are specified as part of the family definition. Examples of technology families include DDR, DDR2, and DDR3. In other embodiments, a system 10 may include memory modules from different technology families coupled to different MMIUs 24A-24C. For example, the memory modules coupled to the MMIU 24A may be members of one technology family and the memory modules coupled to the MMIU 24B may be members of another technology family.

In such embodiments, the memory scheduler 18 may implement a fixed latency scheduling algorithm or variable latency scheduling algorithm. The fixed latency may be at least as large as the highest latency from any of the MMIUs 24A-24C. Such a scheme may permit a relatively simple scheduler implementation, in which any read access that is scheduled causes a delay to the next read access of N clock cycles, where N is the number of data transfers on the return link that occur for a read access. In variable latency schedulers, the memory scheduler 18 may use the frequency and address ranges mapped to each MMIU to determine the latency of a given memory access. Accordingly, the memory scheduler 18 may track each memory access latency individually, and may schedule a read access if bandwidth is available at the time that the memory latency associated with that access would expire.

It is noted that, while the preceding description describes an embodiment that includes MMIUs, other embodiments may include a memory controller 16 that directly communicates with memory modules. In such embodiments, the profile control unit and corresponding power profile counter registers may be implemented in the memory controller 16. Similarly, the power control unit may be implemented in the memory controller 16 in such an embodiment.

Figure 2:
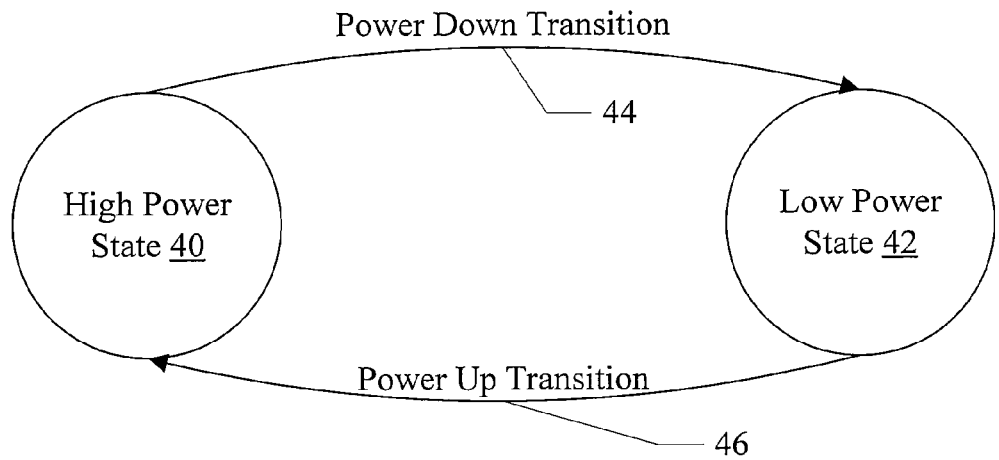
FIG. 2 is a state machine illustrating transitions between a power up state and a power down state, according to one embodiment.

Turning now to FIG. 2, an exemplary state machine that may be implemented by a power control unit 32A-32B is shown. There may be a separate instance of the state machine for each rank of the memory modules attached to the MMIU. Alternatively, there may be a separate instance per memory module, if entry and exit to the low power state is performed on a per memory module basis; or there may be a separate instance per any other granularity at which the entry and exit is performed. The MMIUs 24A-24C may include control logic that implements the state machine.

The state machine includes a high power state 40 and a low power state 42. As mentioned previously, other embodiments may include additional states, as desired. In the high power state 40, normal memory access with normal latencies may be performed. The control logic may detect that no additional memory accesses are in progress or expected for the rank, and may transmit a command to the rank to cause a transition to the low power state (or may implement a low power state for a memory power management mode that is not provided by the memory modules). The state machine may transition to the low power state 42 as well ("power down transition" arc in FIG. 2, reference numeral 44). While in the low power state 42, a memory access may be presented that accesses the corresponding rank. A command may be transmitted to the rank to cause a transition to the high power state (or the transition may occur internally), and the state machine may transition to the high power state 40. In one embodiment, the transition may occur in response to the transmission of the command to exit the low power state. Alternatively, the transition may occur after the number of clock cycles needed to exit the low power state have expired from the transmission of the command to exit the low power state ("power up transition" are in FIG. 2, reference numeral 46).

Figure 3:
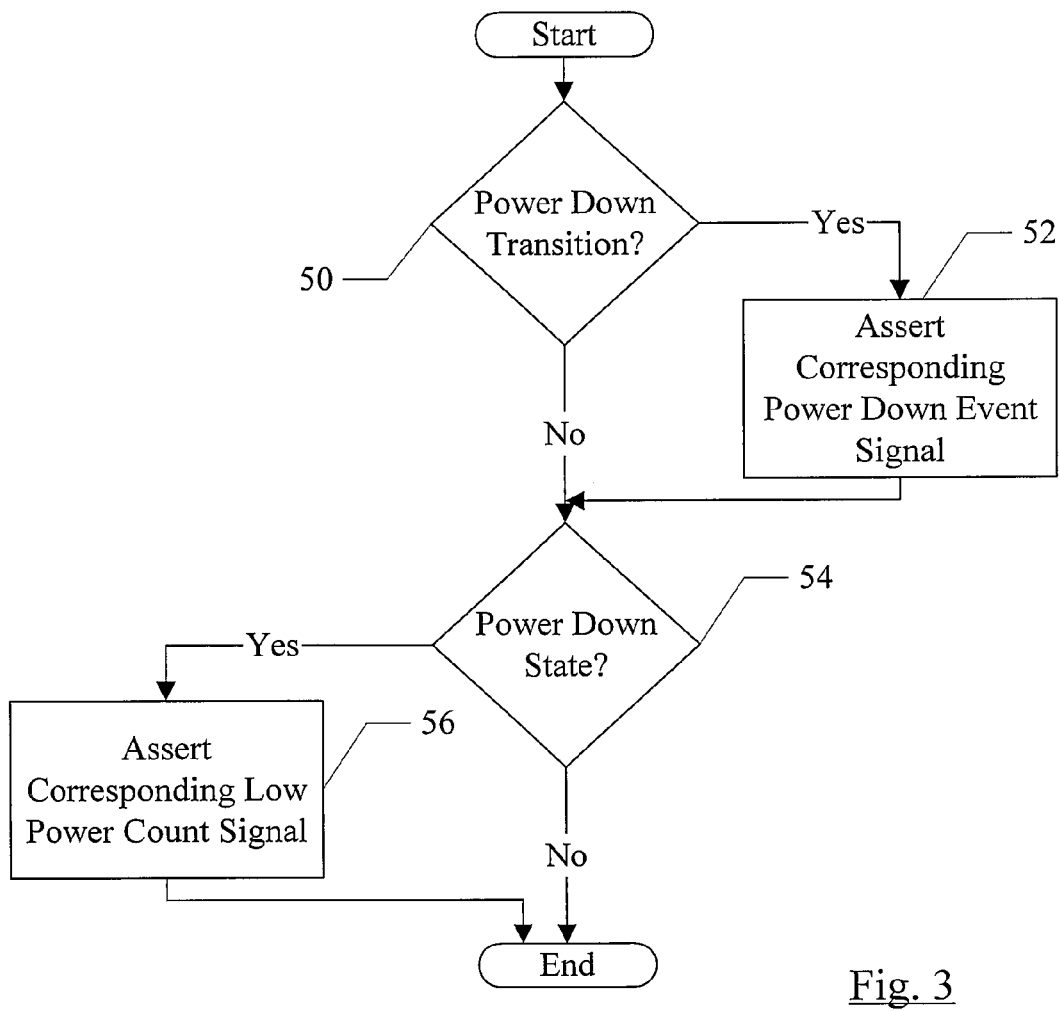
FIG. 3 is a flowchart illustrating generation of event and count signals for the power down state, according to one embodiment.

Turning now to FIG. 3, a flowchart is shown illustrating operation of one embodiment of the profile control units 22A-22B for generating event and count signals for a rank. The profile control units 22A-22B may include circuitry which implements the operation illustrated in FIG. 3 for each rank, in one embodiment. While the blocks are shown in a particular order for ease of understanding, other orders may be used. Additionally, blocks may be performed in parallel in combinatorial logic in the profile control units 22A-22B. The flowchart of FIG. 3 may be iterated each clock cycle of the clock provided by the MMIUs 24A-24C to their respective memory modules 26A-26K.

If the state machine corresponding to the rank makes a power down transition (arc 44 in FIG. 2, decision block 50, "yes" leg), the profile control unit 22A-22B may assert the corresponding power down event signal (block 52). In one embodiment, the power down event signal may also identify the memory power management mode in effect at the time the power down event occurs. That is, the corresponding power down event signal may correspond to the rank and to the memory power management mode that is in effect, and there may be different signals for each rank and memory power management mode. If the state machine is in the low power state 42 (decision block 54, "yes" leg), the profile control unit 22A-22B may assert the corresponding low power count signal (block 56). Again, the corresponding signal may identify both the rank and the memory power management mode, in one embodiment. In other embodiments, the signals identifying rank and memory power management mode may be asserted by the power control unit 32A-32B that implements that state machine.

Figure 4:
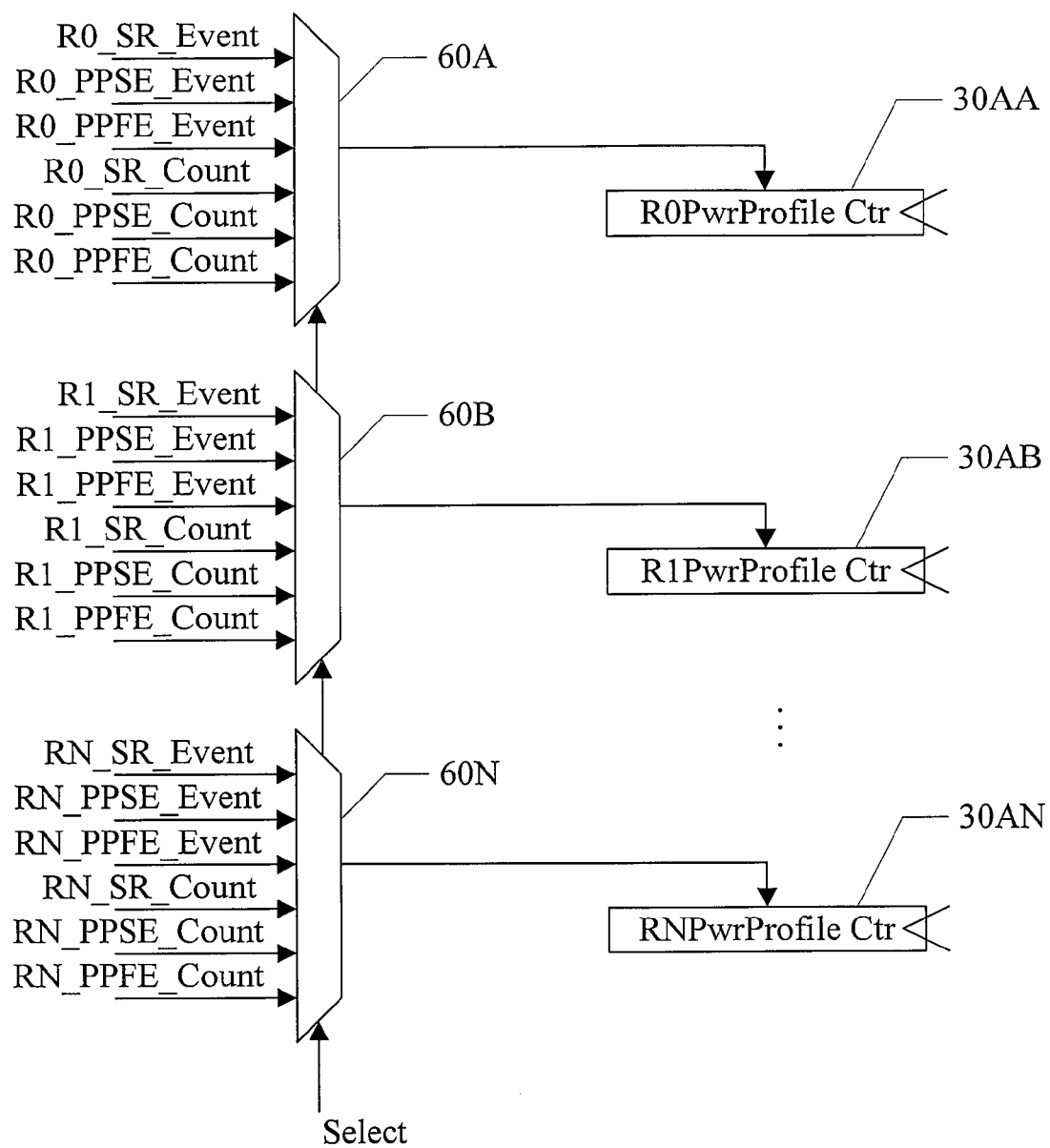
FIG. 4 is a block diagram illustrating selection of signals to update various power profile count registers, for one embodiment.

FIG. 4 is a block diagram illustrating a portion of one embodiment of the profile control unit 22A. The profile control unit 22B may be similar. As shown, the profile control unit 22A includes registers 30AA-30AN corresponding to ranks 0 to N of memory modules coupled to the MMIU 24A. Additionally, muxes 60A-60N are shown having outputs coupled to the respective registers 30AA-30AN. The registers 30AA-30AN may be incrementors that increment their current count values in response to an assertion on the control signal output from the corresponding mux 60A-60N.

The input to each mux 60A-60N is the event and count signals for each memory power management mode for the corresponding rank. Thus, for example, the mux 60A includes: the R0_SR_Event signal for rank 0, the self refresh event; the R0_PPSE_Event signal for rank 0, the PPSE event; the R0_PPFE_Event signal for rank 0, the PPFE event; the R0_SR_Count signal for rank 0, the self refresh clock cycle count; the R0_PPSE_Count signal for rank 0, the PPSE clock cycle count; and the R0_PPFE_Count signal for rank 0, the PPFE clock cycle count. Other embodiments may include event and/or count signals for other memory power management modes, including the memory power management modes that may be implemented by the power control units 32A-32B instead of the memory modules. The select signal provided to the muxes may be configured based on the memory power management mode that is selected along with whether event or cycle count is desired. In other embodiments in which ranks share a counter, the rank that is selected for monitoring may also be provided as part of the select signals and the inputs to the muxes would include signals corresponding to more than one rank. In one embodiment, there may be different select signals for different muxes 60A-60N, based on the granularity at which different memory power management modes are settable.

Figure 5:
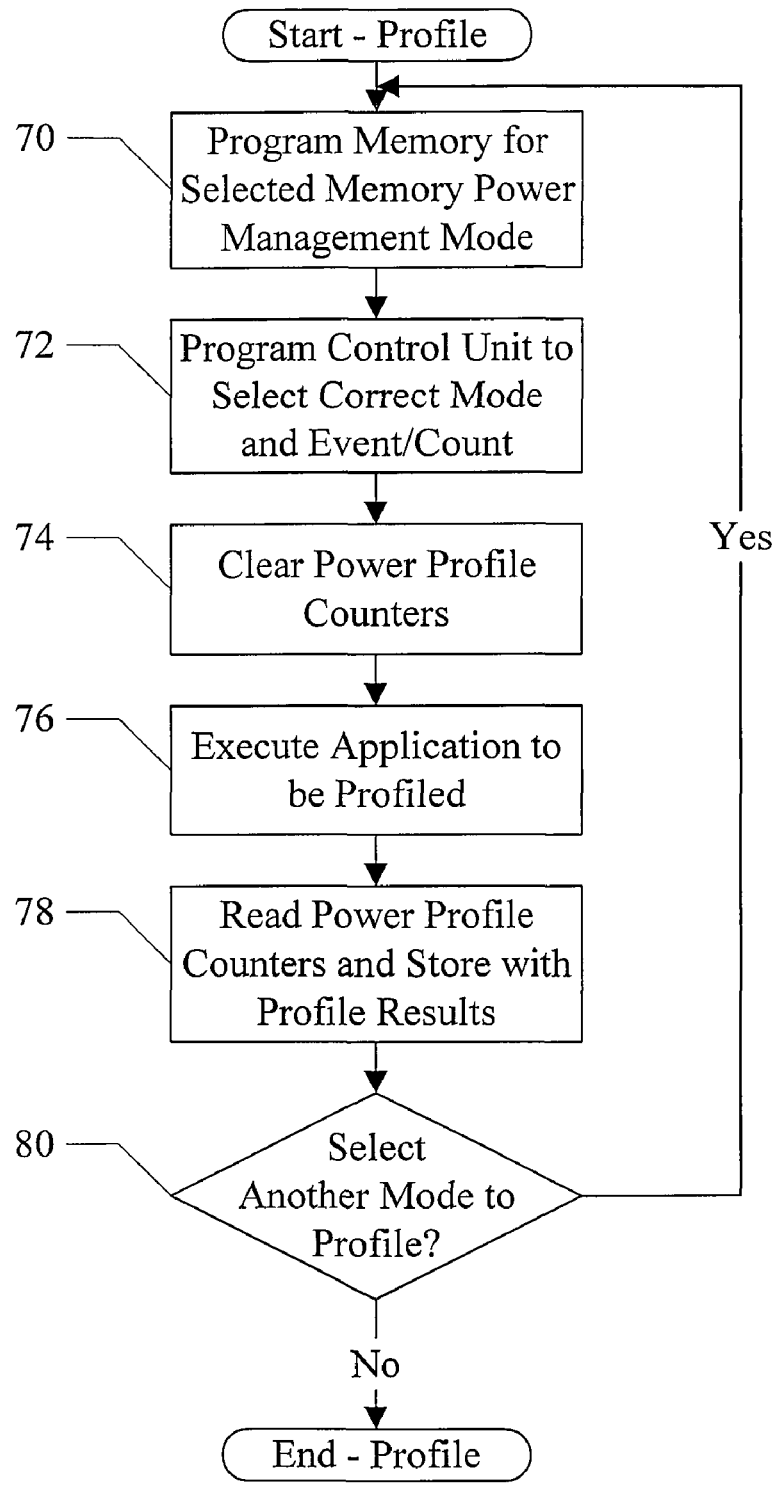
FIG. 5 is a flowchart illustrating one embodiment of executing one or more iterations of a memory power profiler.

Turning next to FIG. 5, a flowchart is shown illustrating one embodiment of executing one or more iterations of a memory power profiler. While the blocks are shown in specific order for ease of understanding, other orders may be used. In one embodiment, the flowchart of FIG. 5 may be implemented in software that may be executable on the computer system 10 (e.g. by the processor 12). That is, the software may includes instructions which, when executed, implement the operation shown in FIG. 5.

The memory power profiler may program the memory system (e.g. via the memory controller 16 and the MMIUs 24A-24C) with the selected memory power management mode (or modes) (block 70). In one embodiment, the same mode may be programmed uniformly throughout the system. In another embodiment, different ranks and/or memory modules may be programmed to different memory power management modes, as desired, at the granularity supported by the memory system. The memory power profiler may also program the profile control units 22A-22B to select the correct memory power management mode and event or count signals through the muxes 60A-60N (block 72). For example, the profile control units 22A-22B may include configuration registers in addition to the power profile counter registers 30A-30B that may be programmed to select the desired event/count signals. The memory power profiler may clear the power profile counter registers 30A-30B (block 74). The memory power profiler may simply write zero to the power profile counter registers 30A-30B, or may transmit a command that causes the power profile counter registers to be cleared. The memory power profiler may permit the application that is being profiled to executed (block 76). Upon termination of the application, the memory power profiler may read the power profile counter registers 30A-30B and store the values as part of the profiling results (block 78). If the memory power profiler is to profile other memory power management modes, or other combinations of memory power management modes (decision block 80, "yes" leg), the memory power profiler may begin another profiling iteration. Otherwise, the profile is complete. The results may, e.g., be written to a file for subsequent display to a user or processing.

Figure 6:
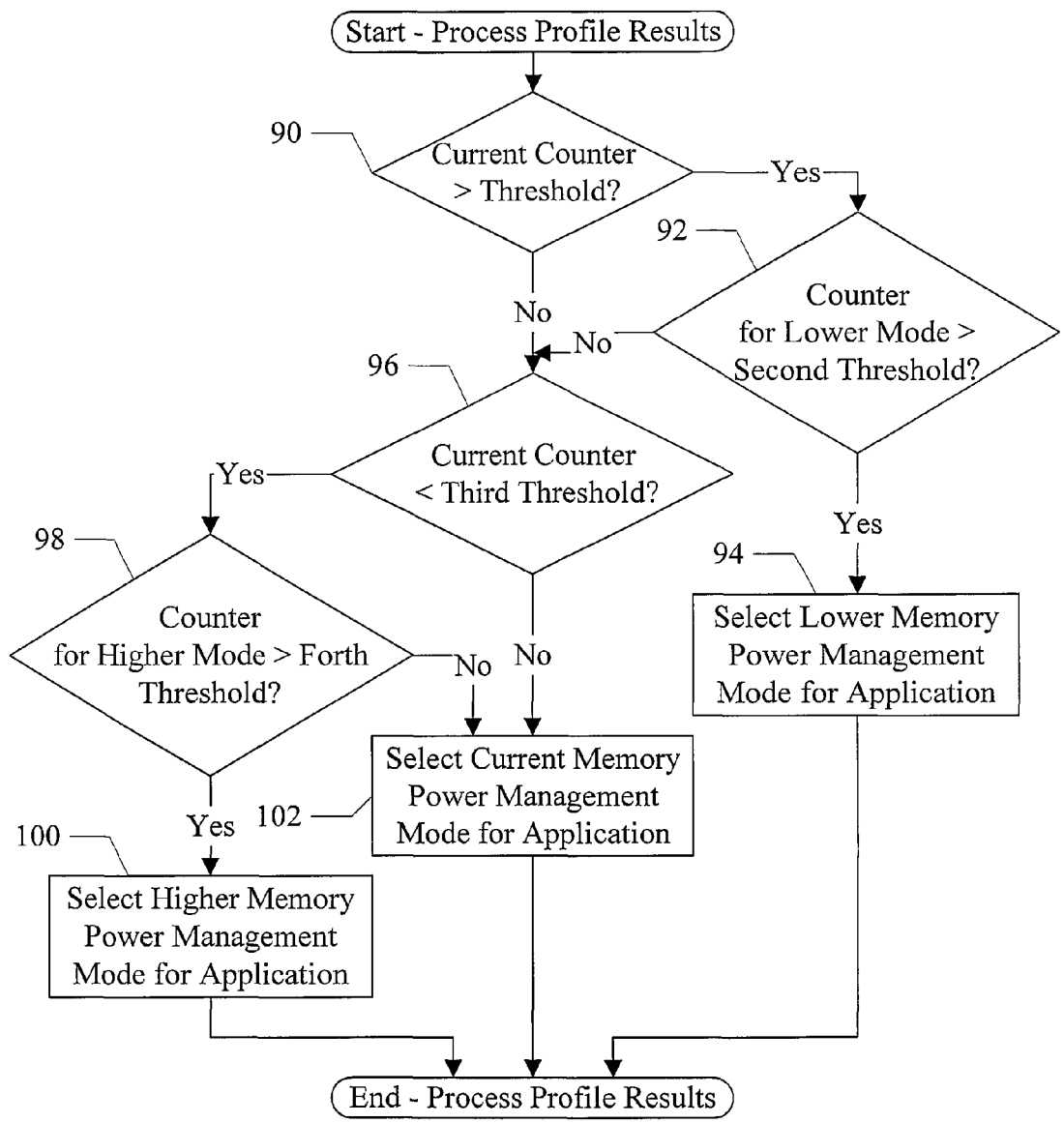
FIG. 6 is a flowchart illustrating one embodiment of processing memory power profiling results.

FIG. 6 is a flowchart illustrating processing of the profile results. In some embodiments the processing may be performed by the memory power profiler. In other embodiment, the processing may be performed manually be reviewing the results. While the blocks are shown in a particular order for ease of understanding, other orders may be used.

The profiled application may be associated with a current memory power management mode (that is, the memory power management mode that is currently in use when the application is executed in the system 10). If the power profile counter corresponding to the current memory power management mode is greater than a defined threshold (decision block 90, "yes" leg), it is possible that the next lower memory power management mode would yield more efficient power management. If the power profile counter for the lower memory power management mode is greater than a second defined threshold (decision block 92, "yes" leg), the lower memory power management mode may be selected for the application (block 94). If the power profile counter corresponding to the current memory power management mode is less than a third defined threshold (decision block 96, "yes" leg), the low power state is not being entered often and a higher memory power management mode may be more efficient. If the power profile counter corresponding to the higher memory power management mode is greater than a fourth threshold (decision block 98, "yes" leg), the higher memory power management mode may be selected for the application (block 100). Otherwise, the current memory power management mode may be selected (block 102).

The thresholds mentioned above may be defined in any desired fashion. For example, they may be defined based on trial and error, attempting to lower the power consumed during execution of the application. Alternatively, the thresholds may be based on calculations of when the higher or lower memory power management mode will be more efficient, based on the power consumption differences of the low power states in each mode. It is noted that, in some embodiments, changing the selected memory power management mode may be based only on thresholds of the current memory power management mode. Such a strategy would require that only the current memory power management mode be profiled.

In addition to using the profile results to select a power management mode for an application, the profile results may also facilitate benchmarking the application power profile under different memory power management modes (possibly in combination with other system power management modes, such as processor power management modes) and thereby generating different power/performance footprints for each mode. Without the profile hardware described herein, power/performance ratios for a specific application (as opposed to the whole processor) under a given/selected memory power management mode and/or other power saving modes would be very difficult or impossible to obtain. Accordingly, the profiling hardware may become an application power/performance profiling guideline to choose modes for the application.

Turning next to FIG. 7, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link. The computer accessible storage medium 200 in FIG. 6 may store the memory power profiler 110, which may be an embodiment of the memory power profiler described herein. That is, the memory power profiler 110 may implement, e.g., the flowcharts of FIGS. 5 and/or 6. Generally, the computer accessible storage medium 200 may store any set of instructions which, when executed, implement a portion or all of the flowcharts shown in FIGS. 5 and 6. A carrier medium may include computer accessible storage media as well as transmission media such as wired or wireless transmission.

It is noted that the present description periodically refers to various hardware, the MMIUs, the memory controller, etc. as being "configured to" implement various features. Generally, such language refers to a broad recitation of structure. The phrase "configured to" in such contexts should be interpreted as "having circuitry" that implements the recited features.

Numerous variations and modifications will become apparent to those skilled in the art once the above disclosure is fully appreciated. It is intended that the following claims be interpreted to embrace all such variations and modifications.

What is claimed is:

1. A method comprising:
   for each memory power management mode of a plurality of memory power management modes supported by one or more memory modules in a memory system of a computer system, wherein each of the plurality of memory power management modes comprises at least a high power state and a low power state:
programming the memory system to use the memory power management mode,
monitoring a power state of the memory system in the programmed memory power management mode during execution of an application,
generating data during the monitoring that describes the monitored power state,
storing the data generated during the monitoring in the one or more registers, and
reading the data from the one or more registers in response to completing the execution of the application; and
processing the data corresponding to each of the plurality of memory power management modes to identify a selected memory power management mode to be used during subsequent executions of the application.

2. The method as recited in claim 1 wherein the monitoring comprises detecting a transition to the low power state of the programmed memory power management mode in at least a portion of the one or more memory modules, and wherein generating the data comprises incrementing a corresponding count in the one or more registers in response to detecting the transition.

3. The method as recited in claim 1 wherein the monitoring comprises detecting a clock cycle of a clock supplied to the one or more memory modules during which at least a portion of the memory module is in the low power state of the programmed memory power management mode, and wherein generating the data comprises incrementing a corresponding count in the one or more registers in response to detecting the clock cycle in the low power state.

4. The method as recited in claim 1 wherein one of the plurality of memory power management modes is a self refresh mode.

5. The method as recited in claim 1 wherein one of the plurality of memory power management modes is a precharge power down fast exit mode.

6. The method as recited in claim 1 wherein one of the plurality of memory power management modes is a precharge power down slow exit mode.

7. The method as recited in claim 1, wherein the processing comprises:
detecting that a count corresponding to a current memory power management mode used during execution of the application exceeds a first threshold;
detecting that a count corresponding to a lower memory power management mode exceeds a second threshold; and
selecting the lower memory power management mode for use during subsequent executions of the application.

8. The method as recited in claim 1, wherein the processing comprises:
detecting that a count corresponding to a current memory power management mode used during execution of the application is less than a first threshold;
detecting that a count corresponding to a higher memory power management mode exceeds a second threshold; and
selecting the higher memory power management mode for use during subsequent executions of the application.

9. The method as recited in claim 1 wherein the memory system further comprises one or more memory management interface units (MMIUs) coupled to the one or more memory modules, and wherein at least one of the plurality of memory power management modes is implemented in the one or more MMIUs.

10. A computer accessible storage medium storing a plurality of instructions executable to perform:
for each memory power management mode of a plurality of memory power management modes supported by one or more memory modules in a memory system of a computer system, wherein each of the plurality of memory management modes comprises at least a high power state and a low power state:
programming the memory system to use the memory power management mode,
monitoring a power state of the memory system in the programmed memory power management mode during execution of an application,
generating data during the monitoring that describes the monitored power state,
storing the data generated during the monitoring in the one or more registers, and
reading the data from the one or more registers in response to completing the execution of the application; and
processing the data corresponding to each of the plurality of memory power management modes to identify a selected memory power management mode to be used during subsequent executions of the application.

11. The computer accessible storage medium as recited in claim 10 wherein the monitoring comprises detecting a transition to the low power state of the programmed memory power management mode in at least a portion of the one or more memory modules, and wherein generating the data comprises incrementing a corresponding count in the one or more registers in response to detecting the transition.

12. The computer accessible storage medium as recited in claim 10 wherein the monitoring comprises detecting a clock cycle of a clock supplied to the one or more memory modules during which at least a portion of the memory module is in the low power state of the programmed memory power management mode, and wherein generating the data comprises incrementing a corresponding count in the one or more registers in response to detecting the clock cycle in the low power state.

13. The computer accessible storage medium as recited in claim 10 wherein one of the plurality of memory power management modes is a self refresh mode.

14. The computer accessible storage medium as recited in claim 10 wherein one of the plurality of memory power management modes is a precharge power down fast exit mode.

15. The computer accessible storage medium as recited in claim 10 wherein one of the plurality of memory power management modes is a precharge power down slow exit mode.

16. The computer accessible storage medium as recited in claim 10 wherein the processing comprises:
detecting that a count corresponding to a current memory power management mode used during execution of the application exceeds a first threshold;
detecting that a count corresponding to a lower memory power management mode exceeds a second threshold; and
selecting the lower memory power management mode for use during subsequent executions of the application.

17. The computer accessible storage medium as recited in claim 10 wherein the processing comprises:

detecting that a count corresponding to a current memory power management mode used during execution of the application is less than a first threshold;

detecting that a count corresponding to a higher memory power management mode exceeds a second threshold; and selecting the higher memory power management mode for use during subsequent executions of the application.

18. The computer accessible storage medium as recited in claim 10 wherein the memory system further comprises one or more memory management interface units (MMIUs) coupled to the one or more memory modules, and wherein at least one of the plurality of memory power management modes is implemented in the one or more MMIUs.

19. A method comprising:
monitoring a power state in one or more memory modules in a memory system during execution of an application;

generating data during the monitoring that describes the monitored power state;

storing the data generated during the monitoring in the one or more registers and processing the data, the processing including:

detecting that a count corresponding to a current memory power management mode used during execution of the application exceeds a first threshold;

detecting that a count corresponding to a lower memory power management mode exceeds a second threshold; and selecting the lower memory power management mode for use during execution of the application.

20. The method as recited in claim 19 wherein the processing further includes:

detecting that a count corresponding to a current memory power management mode used during execution of the application is less than a first threshold;

detecting that a count corresponding to a higher memory power management mode exceeds a second threshold; and selecting the higher memory power management mode for use during execution of the application.

\* \* \* \* \*